Inventors:
Steve Eisner,
Carl H. Rowe,
by *Hugh E. Smith*
His Attorney.

3,728,255
Patented Apr. 17, 1973

3,728,255
WATER PURIFICATION WITH POROUS ABRASIVES
Steve Eisner, Schenectady, and Carl H. Rowe, Ballston Lake, N.Y., assignors to Norton Company, Troy, N.Y.
Filed May 20, 1971, Ser. No. 145,297
Int. Cl. C02c 5/04
U.S. Cl. 210—15          11 Claims

ABSTRACT OF THE DISCLOSURE

Apparatus and methods for purifying water containing oxidizable pollutants are disclosed wherein a porous belt aerates the water by alternatively soaking up water or air and discharging such in the opposite phase. In addition to the aeration function, the porous belt may be made abrasive in nature to generate nascent oxygen and hydrogen peroxide which kill undesirable microorganisms, the nascent oxygen and hydrogen peroxide being produced by the abrasive action against the surface of certain materials such as aluminum.

FIELD OF THE INVENTION

Figure 1:
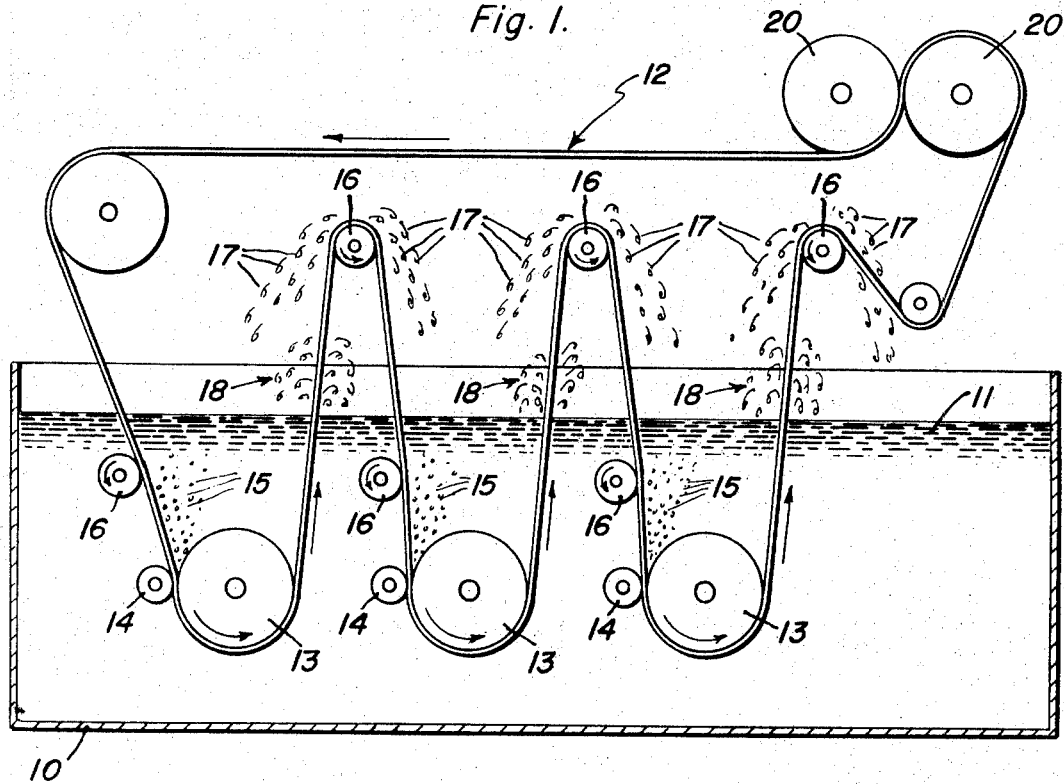

This invention relates to the general field of purifying polluted water. In particular, it relates to a method of aerating the water and producing microorganism killing chemicals during the aeration.

DESCRIPTION OF PRIOR ART

Treating water to make it suitable to be used as drinking water has become an area of prominent importance. With the population of cities and urban areas increasing at a tremendous rate, there has developed major problems in supplying potable water to the population. This problem has been compounded by the pollution of existing ground water sources by industry and the wastes generated by the increased population.

To supply their population with safe drinking water, cities and counties have had to install expensive treating equipment designed to reduce the bacteria and other microorganisms in the water which is available for possible drinking use. Equipment for spraying water into the air to aerate and oxidize bacteria and other microorganisms is common. Such equipment requires large pumping facilities to circulate the water at a sufficient rate. The water is sprayed into the air as fine droplets supplying an increased surface area for water-air contact. However, the large body of water in the storage tank or pond supplying the water lies dormant with only its surface in contact with air. As the sprayed water is only a small portion of the water in the storage pond or tank, it can be seen that the process is rather inefficient. Larger pumping rates and spraying rates increase the efficiency of the process; however, this requires the installation of very large, cumbersome and expensive equipment.

Treating of potentially potable water with chemicals is also a commonly employed method for reducing pathogenic and other undesirable organisms in the water. These chemicals, such as chlorine, are pumped into the water and the concentration of such chemicals must be closely controlled to avoid concentrations in the drinking water which not only kills bacteria but is also harmful to humans. Even at acceptable concentration levels these chemicals give an unpleasant taste and aroma to the water. Chemicals other than chlorine, such as ozone, require very expensive treating equipment and have therefore not been widely used.

SUMMARY OF THE INVENTION

In general, there is provided by the present invention a method and apparatus for aerating polluted water which is simple and inexpensive, and which also may provide for chemical treatment of the water. The apparatus and method provides for both spraying of water droplets in air, as well as dispersing small air bubbles in the body of water in the storage tank or pond, thereby markedly increasing the efficiency of the aeration method. The body of water is no longer dormant but is constantly agitated with small bubbles of air which increases the surface area of water-air contact. The apparatus and method also may provide for the generation of nascent oxygen and hydrogen peroxide which both are known to effectively kill pathogenic and other undesirable organisms in water.

In the performance of this invention, there is provided a porous (preferably coated abrasive) belt, disc or drum which aerates the water being treated. The belt, disc or drum has a porous backing, preferably made of a foam material, which is resilient and has the property of being able to alternatively soak up water and air and to discharge the water or air when squeezed in the presence of the opposite phase. The belt, disc, or drum is rotated so that there is always a portion of the porous material in the water and a portion in the air. Squeezing mechanisms, usually in the form of rollers are provided to compress the porous material when it is in the water as well as in the air. The water containing porous material emerges from the water phase and is squeezed to rid itself of the contained water which is allowed to cascade back into the body of water. The porous material is then allowed to recover and fill with air before it enters the water phase. The porous material is squeezed again in the water phase generating very fine air bubbles dispersed in the water. The spongy material is again allowed to expand and fill with water before it again emerges from the water to repeat the process.

In addition to aerating the water, the porous belt, disc or drum when made abrasive can also be used to generate chemicals such as nascent oxygen and hydrogen peroxide which can kill undesirable microorganisms. These chemicals are produced by abrading the surface of certain materials with the abrasive belt, disc or drum. It is known in the prior art to produce nascent oxygen by abrading the surface of silica material. It is also known that hydrogen peroxide is formed when surfaces of metals or ionic crystals are abraded in the presence of water. The present invention incorporates this chemical-producing effect into the aeration process described above by having the porous, abrasive coated belt, disc or drum rub against and abrade quartz, aluminum, zinc, silica and other materials known to produce nascent oxygen or hydrogen peroxide on abrasion of their surfaces. As the porous, abrasive coated belt, disc or drum is rotated it is brought into contact with particles of quartz, aluminum, etc., named above.

DRAWINGS

The present invention is explained hereinafter in greater detail by reference to the accompanying drawings which show the preferred embodiments of this invention. It should be understood, however, that the drawings and examples are given for purposes of illustration only and that the invention in its broader aspects is not limited thereto.

Figure 2:
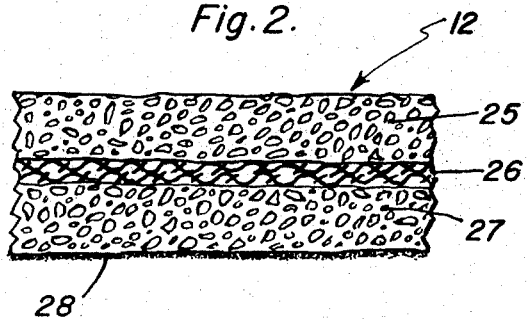
Figure 3:
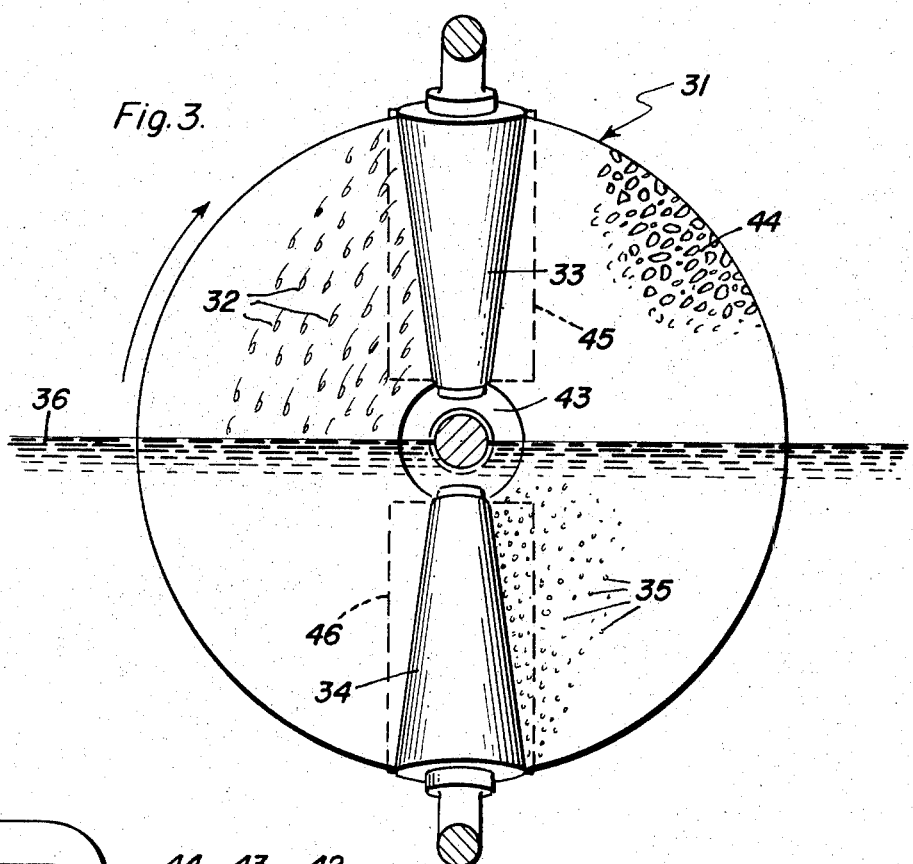

In the drawings:
FIG. 1 is a side view, partly schematic, of one preferred embodiment of apparatus employing this invention.
FIG. 2 shows, diagrammatically, a cross section of a preferred embodiment of the porous, abrasive coated material used in this invention.
FIG. 3 is a front view of another preferred embodiment of apparatus employing this invention.

Figure 4:
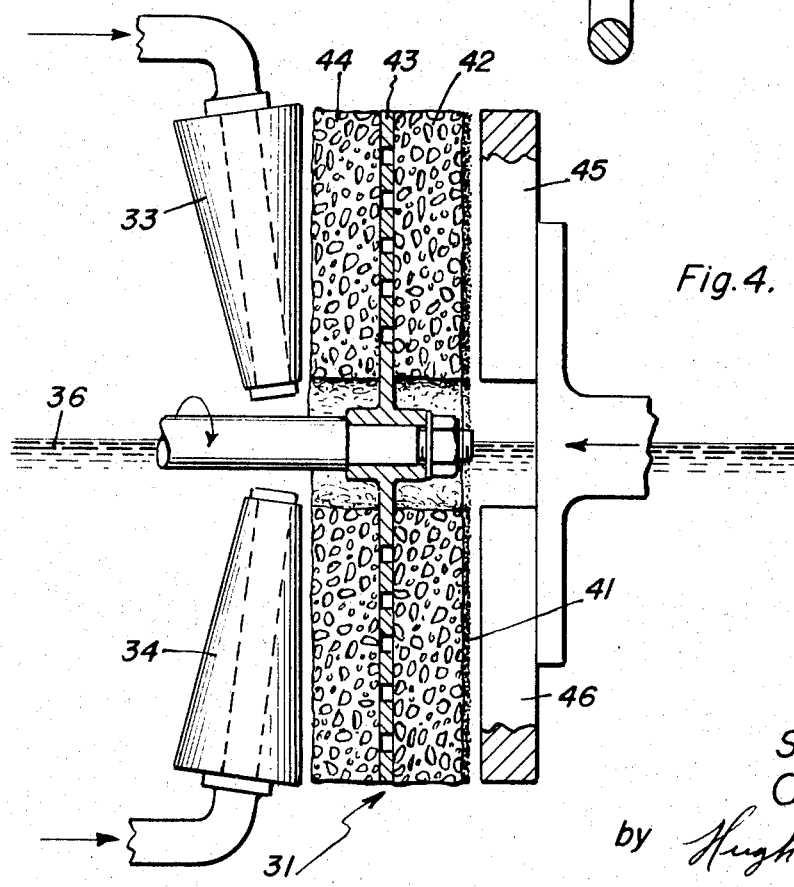

FIG. 4 is a side view of the apparatus shown in FIG. 3.

DESCRIPTION OF PREFERRED EMBODIMENTS

Referring now to FIG. 1 there is shown a preferred embodiment of the present invention comprising a water tank 10, holding water at a level 11, a porous, abrasive coated belt 12, underwater rotating rolls 13 and 14, guide rolls 19, drive rolls 20, and abradable members 16. The belt 12 moves in the direction indicated in FIG. 1. As the belt enters the water it is filled with air. The belt is squeezed between roll 13 and roll 14 generating very fine air bubbles 15 which are dispersed in the water. As belt 12 leaves roll 13, it expands and fills itself with water. Then, as the belt 12 emerges from the surface 11 of the water, it pulls with it a spray of water drops 18, and then it is compressed going around abrading member 16, which squeezes the water out of belt 12 creating a water cascade 17. As belt 12 leaves abrading member 16 it expands and is filled with air and starts the aeration cycle over again. In FIG. 1 there are shown three such cycles.

The other function performed by the apparatus of FIG. 1, namely, the making of chemicals such as nascent oxygen and hydrogen peroxide, is accomplished as the coated abrasive belt 12 is drawn over abradable members 16 which may be positioned either in the air or the water zone or in both as is illustrated in FIG. 1. Abradable member 16 is made of aluminum, zinc, silica or other materials which are known to form $H_2O_2$ or nascent oxygen on abrasion.

A cross section of belt 12 is shown diagrammatically in FIG. 2. The belt comprises a reinforcing scrim section 26, laminated on both sides with a layer of foamed material 25 and 27 which is capable of absorbing water and air alternatively. Such foamed materials should be flexible, resilient, relatively low density and of open cell rather than closed cell configuration, e.g. polyurethane or polyvinyl chloride. On at least one side of the belt a coating of abrasive material 28 such as aluminum oxide or silicon carbide suspended in a carrier of varnish or synthetic resin solution which upon drying and curing exhibits a high degree of water resistance is applied to the foamed material 27. As illustrated in FIG. 1, the abrasive would be coated on the outside surface of belt 12 so that the abrasive grain will be brought into rubbing contact with the abradable members 16. The abradable members 16 are preferably rotated in a direction opposite to the travel of belt 12, which for FIG. 1 as illustrated would be counter-clockwise. By rotating members 16 in such a manner they will be abraded to a greater degree than if they were not rotated. The greater the degree of abrasion, the greater amount of microbicidal chemical generated.

Another preferred embodiment of apparatus employing the present invention is shown in FIGS. 3 and 4. The belt 12 of the apparatus shown in FIG. 1 is replaced with a disc 31 which is constructed of a perforated disc 43 of metal or plastic which has laminated to it on both sides a thickness of foamed material 42 and 44. Coated on the outside faces of lamina 42 is a dispersion of abrasive material 41. The perforated disc can be made from water-resistant plastics such as nylon, Mylar or the like. The foamed material is made of the same material as for the foamed material of belt 12 of FIG. 1. The abrasive coating is also similar to the abrasive coating of belt 12 in FIG. 1.

In operation, the disc 31 rotates either clockwise or counter-clockwise, and the tapered rollers 33-34 and abradable bars 45 can be moved toward the disc 31 so as to compress that part of the disc caught between the rollers and abradable bars. The aeration step is similar to that of the apparatus of FIG. 1. As the foamed material enters the water it is filled with air, and as it is compressed between the roller 34 and abradable bar 46 fine air bubbles 35 are generated. As the disc emerges from the water surface 36 and is compressed between roller 33 and abradable bar 45, a cascade of water 32 is created. The generation of nascent oxygen and hydrogen peroxide is accomplished by the abrasive coating 41 making rubbing contact with abradable bars 45 and 46.

Example

Using the equipment arrangement of FIG. 4, polluted water with a BOD of 200 p.p.m. and a coliform bacteria count of $10^8/100$ cc. can be treated. The BOD can be reduced to 20 p.p.m. and the coliform bacteria count to $10^2/100$ cc. by this method.

The water tank 10 is filled with one gallon of polluted water having the characteristics as given above. Disc 31 which is 10" in diameter, constructed of ¼" thick hard rubber having laminated thereto on each face an open-cell vinyl foam layer (¾" thick) and coated on one side with 1,000 grit aluminum oxide grain anchored to the foam by a conventional phenolic resin binder, is rotated at a speed of 500 revolutions per minute. The abradable bars are made of aluminum. The time of treatment is approximately one hour.

While preferred embodiments of the invention have been disclosed above, it will be obvious to one skilled in the art that many modifications and variations can be made within the scope of the present disclosure, and therefore this invention is to be limited only by the scope of the attached claims.

We claim:
1. An apparatus for treating water comprising:
   (a) a reservoir or tank containing water to be treated;
   (b) a porous, resilient material capable of alternately
      (i) soaking up water and air and (ii) discharging water into surrounding air and air into surrounding water when compressed; and
   (c) means for alternately compressing said porous material,
      (i) under the water surface thereby releasing air contained in the porous material and then allowing the porous material to recover and fill with water, and
      (ii) above the water surface thereby releasing the water contained in the porous material and then allowing the porous material to recover and fill with air.
2. Apparatus as in claim 1 wherein the porous material is an endless belt run between two solid nip rolls which compress the belt under the surface of the water and the belt is then drawn out of the water into the air where the belt is drawn over a bar which compresses the belt.
3. Apparatus as in claim 2 wherein the porous, resilient belt has a structure comprising a reinforcing scrim, laminated on both sides with a foam material, which is capable of absorbing water and air alternately.
4. Apparatus as in claim 2 wherein said bar is formed from abradable material capable of generating chemicals which kill bacteria and other undesirable microorganisms when abraded, and said porous, resilient material is coated on at least the side thereof in contact with said bar with an abrasive material.
5. Apparatus as in claim 1 wherein the porous material is a rotatably-mounted circular disc which is so positioned that a portion of the disc is submerged in the water and a portion thereof is simultaneously in the air above the water surface, said disc being alternately compressed under and above the water surface between tapered rollers and associated bar members.
6. Apparatus as in claim 5 wherein the porous, resilient disc has a structure comprising a perforated substantially rigid disc having laminated on both sides thereof a layer of foamed material which is capable of absorbing water and air alternately.

7. Apparatus as in claim 5 wherein said bars are formed from abradable material capable of generating chemicals which kill bacteria and other undesirable microorganisms when abraded, and said porous, resilient material is coated on at least the side thereof in contact with said bars with an abrasive material.

8. A process for treating water which comprises:
(a) alternately cycling a porous, resilient material (i) into a water medium and then (ii) into an air medium above the water surface;
(b) compressing the said porous material while under the water surface thereby releasing air and then releasing compression to allow the porous material to recover and fill with water; and
(c) compressing the said porous material while in the air above the water surface thereby releasing water and then releasing compression to allow the porous material to recover and fill with air.

9. A process as in claim 8 wherein the porous, resilient material is in the form of an endless belt.

10. A process as in claim 8 wherein the porous, resilient material is in the form of a circular disc.

11. A process as in claim 8 wherein said porous material has an abrasive surface and is brought during said compressing steps into abrading contact with an abradable material capable of generating chemicals which kill bacteria and other undesirable microorganisms when abraded.

References Cited

UNITED STATES PATENTS

| | | | |
|---|---|---|---|
| 3,352,297 | 11/1967 | Martin et al. | 261—92 X |
| 3,252,691 | 5/1966 | Getzin et al. | 261—80 |

MICHAEL ROGERS, Primary Examiner

U.S. Cl. X.R.

210—63, 64, 150, 220; 261—80